United States Patent
Yassa et al.

(10) Patent No.: US 9,418,655 B2
(45) Date of Patent: Aug. 16, 2016

(54) METHOD AND APPARATUS TO MODEL AND TRANSFER THE PROSODY OF TAGS ACROSS LANGUAGES

(71) Applicant: SPEECH MORPHING SYSTEMS, INC., Campbell, CA (US)

(72) Inventors: Fathy Yassa, Campbell, CA (US); Caroline Henton, Campbell, CA (US)

(73) Assignee: SPEECH MORPHING SYSTEMS, INC., Campbell, CA (US)

( * ) Notice: Subject to any disclaimer, the term of this patent is extended or adjusted under 35 U.S.C. 154(b) by 0 days.

(21) Appl. No.: 13/744,391

(22) Filed: Jan. 17, 2013

(65) Prior Publication Data

US 2014/0200892 A1   Jul. 17, 2014

(51) Int. Cl.
*G10L 15/18*     (2013.01)
*G10L 13/00*     (2006.01)
*G06F 17/28*     (2006.01)
*G10L 25/90*     (2013.01)
*G10L 13/10*     (2013.01)

(52) U.S. Cl.
CPC .............. *G10L 15/18* (2013.01); *G06F 17/289* (2013.01); *G10L 13/00* (2013.01); *G10L 13/10* (2013.01); *G10L 2025/906* (2013.01)

(58) Field of Classification Search
CPC .............................. G10L 13/10; G06F 17/289
USPC .................................................. 704/263, 277
See application file for complete search history.

(56) References Cited

U.S. PATENT DOCUMENTS

| | | | | |
|---|---|---|---|---|
| 7,496,498 | B2 * | 2/2009 | Chu | G10L 13/08 704/2 |
| 8,073,696 | B2 * | 12/2011 | Kato | G10L 13/033 704/260 |
| 8,321,225 | B1 * | 11/2012 | Jansche et al. | 704/263 |
| 8,401,849 | B2 * | 3/2013 | Chandra | G10L 13/06 704/235 |
| 8,886,539 | B2 * | 11/2014 | Chen | 704/268 |
| 9,093,067 | B1 * | 7/2015 | Jansche | G10L 13/10 |
| 9,195,656 | B2 * | 11/2015 | Fructuoso | G06F 17/289 |

* cited by examiner

*Primary Examiner* — Susan McFadden
(74) *Attorney, Agent, or Firm* — Sughrue Mion, PLLC

(57) ABSTRACT

A method of transferring the prosody of tag questions across languages includes extracting prosodic parameters of speech in a first language having a tag question and mapping the prosodic parameters to speech segments in a second language corresponding to the tag question. Accordingly, semantic and pragmatic intent of the tag question in the first language may be correctly conveyed in the second language.

6 Claims, No Drawings

METHOD AND APPARATUS TO MODEL AND TRANSFER THE PROSODY OF TAGS ACROSS LANGUAGES

BRIEF OVERVIEW OF PROCEDURE

1. A person speaks in language number one (L1)
2. The L1 speech is recognized by ASH, or manually
3. Ensure ASH engine classifies and rejects background noise as non-speech
4. Search recognized speech signal for known non-linguistic physical information, e.g. laughter, coughs, throat-clearing, sneezes, claps etc.
5. More generally, search for components in speech that are used as markers of hesitation, repetition, fillers, turn-retention etc.
6. Extract and classify the physical sounds as speaker-specific and retain as delivered in the original L1 speech
7. Translate the text output from the ASH to language number two (L2)8. Translate hesitation sounds, stutters, repetitions and false starts into the corresponding L2 segments to be synthesized
9. Synthesize the L2 speech and map the hesitation, repetition etc. sounds L1 to the corresponding parts of the L2 synthesized speech.
10. Insert the original speaker-specific physical sounds in the correct places in the L2 synthetic speech
11. Output synthesized L2 speech to include all the non-linguistic and salient discourse components of the L1 speech Introduction One of the steps taken to ensure the best performance of an automatic speech recognition (ASH) system is to classify the incoming speech into sorting 'bins'. The highest level classifications will be between background noise and speech; next will be between male/female speakers, followed by age, size of head, vocal tract length, etc. The incoming signal contains meaningful semantic content (words and partial words), and prosody. The speech acoustic signal will also have physical non-meaningful sounds, such as coughs, hiccoughs, and throat-clearing.

Furthermore, natural spontaneous speech features meaningful sounds that are hesitations, false-starts, fillers and the so forth. The challenge for an ASR system is to sort these 'partials' in speech into a class that will be retained as important to the message delivered; and to translate the partials into the appropriate partials in a second language (L2), which will then be produced using a speech synthesizer.

This invention deals with the linguistic viability of classifying, recognizing and mapping the non-speech physical and partial (e.g. hesitation) components of speech produced in Language 1 (L1) to the non-speech and partial (e.g. hesitation)components of speech synthesized in Language 2 (L2). The L2 synthetic speech will thus have the corresponding partials in the appropriate places in the speech stream, along with the physical non-meaningful sounds produced by the speaker of L1.

The specific goals are (a) to improve speech recognition accuracy and (b) to enhance the naturalness of the synthetic speech produced as result of translating from L1 spoken input to spoken (synthetic) output in L2. The steps to achieve this are detailed below.

In a typical ASR system, the primary goal is to recognize only the text of speech spoken in Language 1 (L1). Acoustic information present in the signal, such as background noise, side-speech, laughter, snorts, sneezes, coughs, throat-clearing and other non-semantic load-bearing material is usually labelled and discarded.

Other non-semantic items such as false-starts, stutters/stammers and hesitation sounds are similarly recognized, labelled and usually discarded for improved recognition accuracy.

Background non-speaker noise, especially when extended (e.g. strong static, bangs, door slams, gun shots, etc.) is especially disruptive to an ASR engine's ability to recognize the speech of the speaker. Such noises) should be classified as non-speech and discarded.

e.g. [noise/] Armed. Firing [/noise]

The methods outlined here seek to classify and retain the non-semantic speech items into two classifier bins: personal non-semantic load-bearing physical material; and speaker-specific discourse components, such as hesitation sounds, stutters etc. The first set shall be inserted just as produced originally into the synthesized speech in Language 2 (L2). The second set shall be translated appropriately and inserted in the L2 synthesized speech. The paragraphs below detail examples of these two kinds of extra-linguistic acoustic information in the speech signal.

1. Partial Words (audio cuts out)

Partial words (words cut off at the beginning, middle or end of the word) may be marked with + at the beginning of the word (no space separating the + from the word). The recognizer may spell out whole word in standard orthography; and may represent how the word was pronounced. This notation does not pertain to those examples where the speaker trails off or does not complete the word.

e.g. Say that again +please.

1. Speaker Noises

Speaker noises occurs within a speaker's turn. They may include, inter Olia, cough, sneeze, snort, hiccough, belch, laughter, breath, yawn, lip-smack. These universal physical non speech sounds should present few problems for a speech classifier and will be labelled as individual information to be recognized by the ASR and retained by the ASR to be included in the production of L2.

2. Partial Words

For these partial words, also known as false starts, the part of the word that is heard should be recognized as separate, partial segment(s), and may be transcribed followed by a dash.

e.g. Let's tr- Let's t~ that again.

These may present problems for a speech classifier and may be mis-labelled.

Nevertheless the segments should be recognized by the ASR and retained in L1 and the same partial segment(s) should be included in the production of L2.

3. Spelled Out Words

If a speaker spells out the letters of a word, each individual letter of the word should be preceded by a tilde (~) and written with a capital letter. Each spelled-out letter should be space-separated. This would indicate that the speaker said the word 'fear' and then spelled it out.

e.g. It's fear, ~F ~E ~A ~R

Individual letters are notorious in presenting problems for a speech classifier and may be mis-labelled. Nevertheless the segments should be recognized by the ASR and retained in L1 and the individual letters should be included in the production of L2.

4. Hesitation sounds, filled pauses

There are universal hesitation words and sounds and language-specific ones. They all serve the same function: to allow the speaker time to think and/or to retain a turn in a conversation. The lists below separate some universal hesitation sounds from those that are particular to US English, French, Arabic and Russian.

Universal: ah, ah-ha, ay, eh, see, ha(h), hm, huh, mm, mm-hm, o of, oh, ooh, uh, um English: a ch, ahem!, ay-yi-yi, duh, er, ew, gee z, free, he-hem, oho, jeepers, n ah, o ch, o op, oops, ow, uh-huh, uh-oh, well, whew, whoa, whoo-hoo, whoops, yo y, yeah, yep, y uh, yup French: ay-ee, bah, hen, corn me, he in, eh hen, eh bi en, e uh, genre, oui, qua, style, tu so is, tu vies, Arabic: ya'ni ('I mean'), wallabies) ('by God') yeah-ah Other frequent fillers used in English are "actually", "basically", "like", "y'know" and "you know what I mean". These should be translate into the equivalent words/phrases in L2. "ahem!" is the conventional orthographic form used in English to represent a speaker's clearing their throat.

In Russian, fillers are called cnoea-napa3umb/ ("vermin words"); the most common are 3-3 ("eh"), 3mo ("this"), moan ("that"), Hy ("well"), 3HaL/um ("it means"), ma K ("so"), KaK ea o ("what's it [called]"), mun a ("like"), and KaK6b/ ("Uust]like").

Mispronounced Words

Mispronounced words should NOT be recognized by the ASR engine. Nor should the translation or synthesizer steps attempt to represent how the word was pronounced.

Speaker Noises

Sometimes speakers will make noises in between words. These sounds are not "words" like hesitation words. Examples are things like sshhhhhhhhh, sssssssssss, pssssssss. Note these sounds with a backslash and the first two letters of the sound heard. Put spaces around these sounds do not connect them to the previous/following word.

e.g. Well, I/sh I don't know. /ss /ps

N. B.

These sounds should not be confused with elongated words, such as ssshoooot, which should be transcribed in standard orthography—"shoot".

We claim:

1. A method to model and transfer the prosody of tag questions across languages, the method comprising:

receiving speech of a first person speaking in a first language;

analyzing the speech in the first language using automatic speech recognition;

extracting prosodic parameters of the speech in the first language and outputting text in the first language corresponding to the speech in the first language based on the analyzing;

searching the speech in the first language for a tag question in the first language;

translating the text in the first language to text in a second language;

outputting translated speech in the second language that is translated from the speech in the first language based on the translated text in the second language;

analyzing the speech in the first language to find speech segments that correspond to the tag question in the first language;

extracting a fundamental frequency from the speech segments that correspond to the tag question in the first language based on the extracted prosodic parameters of the speech in the first language;

fitting a stylized smooth contour to the fundamental frequency;

mapping the stylized smooth contour into a corresponding part of pitch range of the speech in the second language;

stretching or contracting the stylized smooth contour over time;

aligning the stylized smooth contour with corresponding speech segments in the second language that correspond to the tag question; and applying the smooth contour to the speech in the second language.

2. The method of claim 1, wherein the stylized smooth contour is a cubic spline.

3. The method of claim 1, wherein the first language is English.

4. The method of claim 3, wherein the second language is a language other than English.

5. The method of claim 1, wherein the tag question is a grammatical structure in which a declarative statement or an imperative is turned into a question by adding an interrogative fragment.

6. The method of claim 1, wherein the prosodic parameters comprise at least one of pitch, pitch range, variability within the pitch range, and speech rate.

\* \* \* \* \*